US010328372B2

United States Patent
Mazumder et al.

(10) Patent No.: US 10,328,372 B2
(45) Date of Patent: Jun. 25, 2019

(54) ANTI-MICROBIAL AIR FILTER

(71) Applicant: Corning Incorporated, Corning, NY (US)

(72) Inventors: Prantik Mazumder, Ithaca, NY (US); Wageesha Senaratne, Horseheads, NY (US); Ying Wei, Painted Post, NY (US)

(73) Assignee: Corning Incorporated, Corning, NY (US)

(*) Notice: Subject to any disclaimer, the term of this patent is extended or adjusted under 35 U.S.C. 154(b) by 278 days.

(21) Appl. No.: 14/712,112

(22) Filed: May 14, 2015

(65) Prior Publication Data

US 2015/0367270 A1 Dec. 24, 2015

Related U.S. Application Data

(60) Provisional application No. 62/014,474, filed on Jun. 19, 2014.

(51) Int. Cl.
  *B01D 46/00* (2006.01)
  *B01D 46/24* (2006.01)

(52) U.S. Cl.
  CPC ..... *B01D 46/0028* (2013.01); *B01D 46/0001* (2013.01); *B01D 46/247* (2013.01); *B01D 2046/2433* (2013.01); *B01D 2046/2437* (2013.01)

(58) Field of Classification Search
  CPC ....... B01D 46/01; B01D 46/28; B01D 46/247
  See application file for complete search history.

(56) References Cited

U.S. PATENT DOCUMENTS

| | | | | |
|---|---|---|---|---|
| 6,146,451 A | * | 11/2000 | Sakata | B01D 39/2034 55/385.2 |
| 6,231,817 B1 | * | 5/2001 | Shimoda | B01D 53/945 422/177 |
| 6,352,578 B1 | * | 3/2002 | Sakata | B01D 53/02 55/385.2 |
| 6,579,352 B1 | | 6/2003 | Tanaka et al. | |
| 7,238,217 B2 | | 7/2007 | Cutler et al. | |
| 8,172,925 B2 | * | 5/2012 | Bae | A61L 2/16 423/239.1 |
| 8,187,353 B2 | | 5/2012 | Beall et al. | |
| 8,673,207 B1 | | 3/2014 | Boger | |
| 8,702,832 B2 | | 4/2014 | Dietz | |
| 2008/0292843 A1 | | 11/2008 | Oya et al. | |
| 2010/0239679 A1 | * | 9/2010 | Greene | A01N 25/26 424/490 |
| 2011/0182777 A1 | | 7/2011 | Dietz et al. | |

(Continued)

OTHER PUBLICATIONS

International Search Report, issued in connection with corresponding PCT application No. PCT/US2015/35071, dated Sep. 2, 2015.

(Continued)

*Primary Examiner* — Robert A Hopkins
(74) *Attorney, Agent, or Firm* — Shantanu Pathak; Svetlana Z. Short

(57) ABSTRACT

An air filter article, including:
  a wall-flow honeycomb particulate filter; and
  at least one anti-microbial agent on at least a portion of the interior surfaces. The disclosure also provides a filtration system that incorporates or uses the air filter article, and methods for making the air filter article.

15 Claims, 2 Drawing Sheets

(56) References Cited

U.S. PATENT DOCUMENTS

2012/0177831 A1* 7/2012 Dawes .................. C04B 35/14
427/384
2016/0107114 A1 4/2016 Fu et al.

OTHER PUBLICATIONS

Bolashikov, et. al., "Methods for air cleaning and protection of building occupants from airborne pathogens," Building and Environment, v 44, (2009), p. 1378.
Mandy et al., Antimicrobial Activity of zero-valent Iron Nanoparticles, Int. J. of Modern Eng. Res. (IJMER), vol. 2, Issue 1, Jan.-Feb. 2012, pp. 578-581.
English Translation of CN201580032890.7 First Office Action dated Aug. 28, 2018, China Patent Office, 14 Pgs.

* cited by examiner

ANTI-MICROBIAL AIR FILTER

This application claims the benefit of priority under 35 U.S.C. § 119 of U.S. Provisional Application Ser. No. 62/014,474 filed on Jun. 19, 2014 the content of which is relied upon and incorporated herein by reference in its entirety.

The entire disclosure of publications, patents, and patent documents mentioned herein are incorporated by reference.

BACKGROUND

The disclosure relates to a filter article and methods of making and using the article.

SUMMARY

The disclosure provides an air filter article having anti-microbial (AM) properties, and methods of making and using the article.

BRIEF DESCRIPTION OF DRAWINGS

In embodiments.

DETAILED DESCRIPTION

Figure 1:
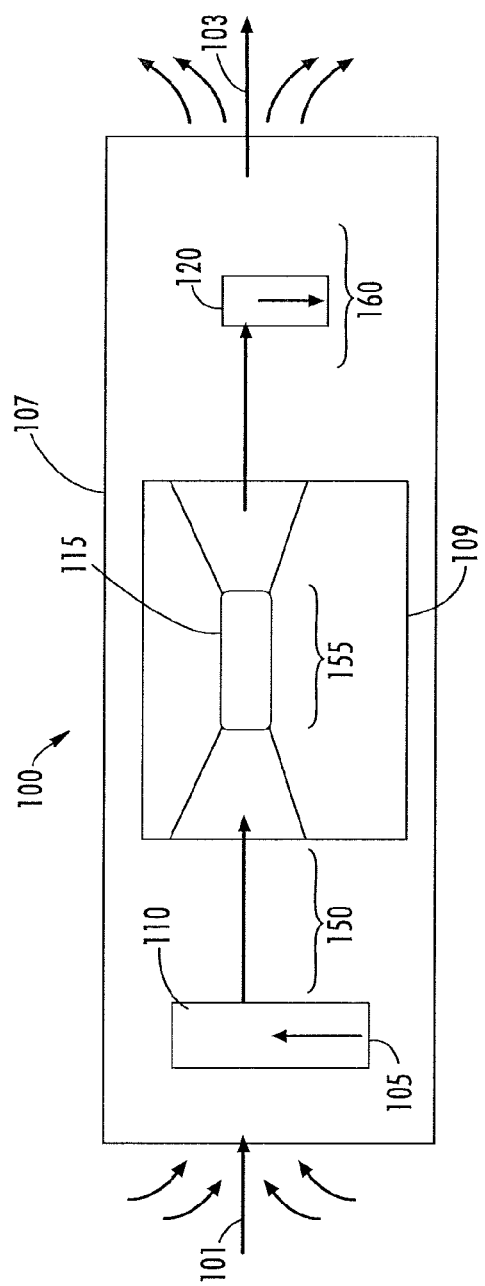
FIG. 1 shows an exemplary aerosol chamber setup and bioactivity data collection points.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"DPF" refers to a diesel particulate filter.

"AM" is an acronym that refers to "antimicrobial" generally (literally: against microbiologicals). "Anti-microbial" generally refers to an agent that kills microorganisms or inhibits microorganism growth. However, "microbial" in the context of "antimicrobial" in the present disclosure can include other airborne and susceptible non-microbial pathogens, such as a virus, a prion, mold, spores, allergens such as dust mites, and like bio-particulates or parts thereof.

"AM-DPF" refers to a disclosed antimicrobial diesel particulate filter.

"AMF" refers to a disclosed antimicrobial filter article based on the disclosed wall-flow architecture. Wall-flow filter architectures are disclosed in, for example, commonly owned and assigned U.S. Pat. No. 8,673,207.

"CFU" or "colony formed unit" refers to a measure of single viable bacterial where, for example, 10 CFU equals 10 live bacteria.

"Wall-flow" refers to any of the disclosed antimicrobial filter articles where the filter article has one or more blocked channel, the input air traverses one or more channels, and the input air penetrates one or more walls of the honeycomb, to accomplish air filtration (i.e., pathogen particulate trapping and reduction), and expose the pathogen to the antimicrobial agent to achieve pathogen kill.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The filter article and methods of the disclosure can include any value or any combination of the values, specific values, more specific values, and preferred values described herein, including explicit or implicit intermediate values and ranges.

The air quality of indoor, interior, or enclosed space is increasingly important as more people inhabit or occupy densely populated space. Population growth and urbanization cause people to work, commute, and even spend leisure time in close proximity of others, which in turn can increase the risk of exposure to air-borne pathogens. These pathogens can originate from variety of sources, such as from an infected person, from infected building materials and HVAC systems, from intentional release such as a terrorist attack (see Bolashikov, et. al., "Methods for air cleaning and protection of building occupants from airborne pathogens," *Building and Environment*, v 44, (2009), p 1378.) Crowded office buildings, schools, theaters, malls, and like structures, and public transportation such as aircraft, trains, and buses, are vulnerable to contamination by such air-borne organisms. Increased mobility has also contributed to instances of rapid dissemination of diseases and pandemics, e.g., SARS (see Bolashikov, et. al., supra.). It is desirable to maintain the integrity of indoor air quality by keeping the environment free of harmful air-borne pathogens, such as bacteria, spores, virus etc.

Various commercially available technologies have been developed for cleansing or keeping indoor air pathogen-free. Some examples include:

Dilution: involves supply of excess volume of clean air into a space to dilute the concentration of pathogens.

Filtration: mechanical capture of pathogens from a flowing stream of air.

Ultraviolet germicidal irradiation: irradiation at 253.7 nm wavelength destroys the DNA/RNA of pathogens rendering them harmless.

Photocatalytic oxidation: oxidation by the electron-hole pair created in UV irradiated photo-catalysts such as $TiO_2$.

Desiccant rotor: purging of VOCs and pathogens from air by a dehumidifier with a silica gel desiccant (see Bolashikov, et. al., supra.).

Each technology has advantages and disadvantages and none has seemed to have established a clear lead in terms market penetration. Cost, ease of installation, flexibility, and versatility, are, for example, parameters that will determine the fate of these technologies.

In embodiments, the disclosure provides an approach to cleansing ambient indoor air of pathogens.

The performance of wall-flow particulate filters, such as Corning Incorporated's Diesel Particulate Filter (DPF), which physically filter air-borne particles from a flowing gas stream are known, see for example, the abovementioned U.S. Pat. No. 8,673,207. A properly designed DPF filter can filter greater than 90% of the carbon particles in the exhaust stream of a diesel engine. In general, the size distribution of the carbon particles is about 20 to 200 nm. As the particles flow with the air-stream through the porous web of the DPF, they are physically captured along the pore walls. There are usually two regimes of filtering. Initially the particles are captured in the interior of the pores. As more particles are captured, the empty space reduces which leads to an increase in pressure drop along the length of the filter. The filtration efficiency of the DPF also increases as more and more particles are captured since the captured particles also act as filtering medium. In the latter stage, a cake formation along the inner wall of the DPF takes place. The cake also acts as a filtering medium. However, the cake formation beyond a certain amount also leads to low permeability of gas stream which rapidly raises the pressure drop (aka. back pressure). Beyond a particular maximum pressure drop, the DPF can be regenerated by a high temperature excursion where the captured particles are burned off.

The size of most bacterial pathogens is about 0.2 to 10 microns, which sizes or diameters are much larger than diesel particulates. So microbial agents can be efficiently captured by the DPF. While many viruses and other pathogens have a smaller size (e.g., about 5 to 10 nm), it has been noted that they usually exist in air in aerosol form with particle size as high as about 10 microns. For example, an infected person or carrier coughs or sneezes into the air aerosol droplets of about 10 to 100 microns containing a suspension of viruses. These aerosol droplets are large enough to be captured in the pores of the DPF, and in any event must contact the impregnated surfaces of the filter article.

Once the pathogens (bacteria, virus, spores, mold etc.) are captured in the porous webs of an untreated DPF, they could remain "alive" for a long time. Worse even, they can grow in population. In this instance the filter may actually act as breeding ground of unwanted pathogens. Spores, molds, etc., growing on HEPA filters, especially in dark and humid environment, is not uncommon.

In embodiments, the disclosed filter article integrates an antimicrobial agent into the DPF walls. This could be accomplished by various approaches, for example, coating the interior walls of the DPF with an antimicrobial agent such as APS, or impregnating the pores with a noble metal such as copper or silver. With appropriate loading of the antimicrobial agents, a high probability of physical proximity between the pathogens and the antimicrobial agent can be achieved.

For the disclosed antimicrobial diesel particulate filter (AM-DPF) to be an effective air-cleaning device it has one or more of the following properties:

high permeability of air stream through the porous web of the walls with very low resistance to flow;

low permeability of pathogens through the porous webs of the walls leading to high capture efficiency;

a sufficiently long enough cycle time before the pores get saturated with pathogens which would call for regeneration or replacement, for example, a cycle time of about 1 month to 1 year, and preferable about 3 to 12 months; and reasonably rapid pathogen kill rate within the filter (i.e., fast chemical kinetics to destroy the captured pathogens).

In embodiments, the disclosure provides a filter article and methods of making and using the article. The filter article in-use operates by a "capture and kill" approach, which is easy to implement, versatile, and manufactureable. The filter article combines the excellent filtration characteristic of a wall-flow particulate filter (such as Corning Diesel Particle Filter, DuraTrap®), the outstanding antimicrobial (AM) capacity of certain materials such as noble metals (e.g., Au, Ag, Cu, Zn), a transition metal oxide such as zero valent Fe nano-particles (see for example, *Int. J. of Modern Eng. Res.* (IJMER), Vol. 2, Issue 1, January-February 2012, pp-578-581), and like metals, and charged polymer material coatings (e.g., quaternary ammonium compounds, aminopropylsilsesquioxanes (APS), or polyethyleneimine siloxane (PEI)).

The "capture and kill" approach first physically traps or captures a pathogen from a flowing stream of air in the filter, such as in the pores of the filter, and then chemically destroys or kills the trapped pathogen with the antimicrobial agent. The disclosed article can be used in a stand-alone or portable air-cleaning unit or can be integrated with the HVAC system of a building.

In embodiments, the disclosure provides an air filter article, such as a diesel particle filter (DPF), having internal surfaces coated with an antimicrobial, such as a surface substantive silicone compound (e.g., APS), impregnated with a metal (e.g., Cu), or a combination thereof. The filter article kills substantially all the physically captured bacteria.

Preliminary experiments have confirmed that a regular DPF, which is un-modified by a antimicrobial agent, physically traps almost 99.7% of the bacteria that is drawn into or sent to the DPF. However, the captured bacteria remain "alive", i.e., biologically active, in the DPF in the absence of any anti-microbial agent. However, a DPF substrate coated with APS, or impregnated with Cu, chemically kills almost 99.97% of the physically captured bacteria. Accordingly, the disclosed device can be used, for example, as an air purifier article in combination with an air handling or air delivery or circulatory system. In such an article and system the pathogens can be trapped at a high efficiency, yet there is minimal risk of the growth and colony formation of the pathogens inside the filter after their capture.

In embodiments, the disclosed filter article, filter system, and methods of making and use are advantaged in several respects, for example:

capable of capturing and killing pathogens;

manufactureable and scalable;

versatile: operationally an air filtration unit that can be a stand-alone or a portable air-cleaning unit or integrated with an HVAC system; and the pore size of filter support structure and the surface chemistry can be tailored to capture and kill many or all forms of pathogens (bacteria, virus, spores, mold, etc.).

The disclosure provides a filter article having anti-microbial properties, and methods of making and using the article. The filter article in-use operates by a "capture and kill" approach, which is easy to implement, versatile, and makeable.

In embodiments, the disclosure provides an air filter article, comprising or consisting of:

a wall-flow honeycomb particulate filter; and at least one anti-microbial (AM) agent on the interior surfaces, i.e., interior surfaces as measured by, for example, BET surface area including surface area attributable to pores, of the filter.

In embodiments, the anti-microbial agent can be, for example, at least one of: a noble metal, a transition metal, a charged organic compound, or a combination thereof.

In embodiments, the anti-microbial agent can be, for example, a noble metal selected from at least one of: Au, Ag, Cu, Zn, a transition metal oxide, such as zero valent iron oxide nanoparticles (FeO), or a combination thereof.

In embodiments, the anti-microbial agent can be, for example, a charged organic compound a quaternary ammonium compound, an aminoalkylsilsesquioxane, e.g., a cage, partial cage, or oligomeric siloxane having a protonated amine functional group, a polyethyleneimine siloxane (PEI), or a combination thereof.

In embodiments, the anti-microbial agent can be, for example, a Cu compound, or an aminopropylsilsesquioxane (APS).

In embodiments, the wall-flow honeycomb particulate filter can have, for example: any filter dimensions of the length, the width, the height, or combinations thereof, of from 1 inch to 5 feet; a % porosity of from 20 to 80 vol %; a pore size of from 1 nm to 100 microns; and a cell density of from 500 to 5,000 cpsi; and combinations thereof.

In embodiments, the wall-flow honeycomb particulate filter comprises at least one of a ceramic, a glass, a composite, a polymer, a paper, or a combination thereof.

In embodiments, the disclosure provides a method of making the abovementioned filter article, comprising, for example, at least one of:

dipping a portion of a wall-flow honeycomb particulate filter into a liquid containing at least one anti-microbial agent;

including an anti-microbial agent in a batch mixture and extruding the mixture through honeycomb forming die;

exposing a honeycomb particulate filter to a vapor containing the anti-microbial agent;

exposing a honeycomb particulate filter to an aerosol containing the anti-microbial agent;

or a combination thereof.

In embodiments, the dipping coats substantially the entire interior surface of the filter article with the anti-microbial agent by capillary action.

In embodiments, the disclosure provides an air purification system, comprising:

at least one air filter article as defined herein; and at least one air handler having a holder for the at least one air filter article, wherein the air handler directs ambient indoor source air through the at least one air filter article and expels filtered air having at least a 99.9% reduction in the numbers of viable pathogens compared to the ambient indoor source air.

In embodiments, the air purification system provides, for example, at least a 99.9% reduction in the number of viable pathogens, and this reduction comprises at least a 90% pathogen capture rate, and at least a 90% pathogen kill rate.

Examples

The following Examples demonstrate making, use, and analysis of the disclosed filter articles in accordance with the above general teachings. The following Examples also demonstrate an ability to control the antimicrobial properties and performance of disclosed filter articles.

Three different filter samples were tested to analyze their air-cleaning performances:

a DPF honeycomb control (control-DPF), which acts as a mechanical particle filter;

a DPF impregnated with antimicrobial Cu nano-particles; and a DPF coated with antimicrobial APS.

Sample Preparation

Cu Coated Honeycomb:

Copper(II) oxide (CuO) suspensions were prepared from copper oxide in water dispersion (Nanophase Technologies or Alpha Asear, 46.8 wt %, 17 to 23 nm primary particle size) by diluting to appropriate dispersions using deionized water. All ingredients were mixed and then sonicated for 10 minutes in a sonicating bath prior to use. Appropriate CuO dispersions (e.g., less than 10 wt/wt % in water) were added to a dipping vessel and the honeycomb DPF, such as cylindrical member having a length of 3 inches and a diameter of 1 inch, was partially dipped into the vessel to permit capillary flow to completely coat the honeycomb in several minutes to hours. The samples were heat treated in an oven at from about 100 to 180° C., such as 120° C., for about 30 mins to 2 hrs, primarily to remove residual water, and then reduced in a hydrogen environment by heat treating the sample, for example, at 600° C. for 3 hr, in a hydrogen atmosphere ($H_2$). The AM loading after reduction in this instance was about 4 wt % based on the weight of the honeycomb article prior to treatment.

APS Coated Honeycomb DPF:

An aqueous aminopropyl silsesquioxane (APS) (Gelest) solution, for example, from about 1 to about 25 wt % of the silsesquioxane in water or mixed solvents, was added to a dipping vessel and honeycomb DPF was partially dipped into the vessel to permit capillary flow to completely coat the honeycomb in several minutes to several hours.

The dip time can depend on, for example, the size of the filter article, the wetting of the filter surface by the coating formulation, and like considerations. The APS coated DPF samples were heat treated in an oven at 120° C. for 0.5 hr to cure the coating. Samples were measured by weighing on an analytical balance to determine the amount of coating applied (mass increase) after the drying and reduction steps. In a representative example, the net APS loading was about 11 to 12 wt %.

Antibacterial Efficacy Testing:

The treated DPF samples were evaluated for antibacterial performance against an untreated control. A Gram-positive bacteria, *B. Subtilis* (ATCC 6633), a non pathogen microorganism found in human feces and a normal gut commensal, was used in this test. Referring to FIG. 1, an aerosol test chamber (100) was set up in a sealed condition with a nebulizer (105) at one end and a bio-sampler (120) at the other end. The nebulizer (105) simulates a source of ambient interior air having a controlled pathogen content. In embodiments, an apparatus such as an air purification system, is open rather than closed to permit intake of indoor source air for filtering. The air purification system additionally has an air intake port (101) and a filtered air exhaust port (103) in addition to the elements shown in FIG. 1. The DPF test filter sample (115) was placed in the middle of and within the chamber. To run the antibacterial test, a bioaerosol was generated from a bacterial liquid suspension with a concentration of $1 \times 10^4$ to $1 \times 10^5$ CFU/L. Before the testing, the viability of the bacterial bioaerosol (110) that was generated by the nebulizer was measured (150) to ensure that the bacterial viability was above 25 to 35% (e.g., 0.3 $N_T^{in}$).

The bioaerosol (110) was kept at an 8 L/min flow rate through the test filter (115), the passed-through air/aerosol was collected by a biosampler (120).

After 70 minutes, the flow rate through the test filter (115) was stopped and the bacteria collected in the biosampler (120) were diluted and plated on the Brain Heart Infusion Agar (BD 211065). The agar plates were cultured for 18 to 24 hrs and the colony number were counted (160) for antibacterial efficacy calculation.

The chamber was kept sealed for 2 hrs with a UV light illuminated to disinfect the chamber, that is, to kill off "ambient" pathogens, such as pathogens present but untrapped and outside the filter article's channels. This procedure is also used for the control DPF, which shows no killing of bacteria.

After 16 hrs, the filter articles were soaked in the Letheen broth (LB), washed with buffer, and the washed buffer was diluted and plated on the Brain Heart infusion agar and then cultured for 18 to 24 hours. The cell colonies were counted for the viable bacterial remaining on the filter (155), using automated imager, such as a ProtoCOL colony counter commercially available from Synbiosis (synbiosis.com).

Figure 2:
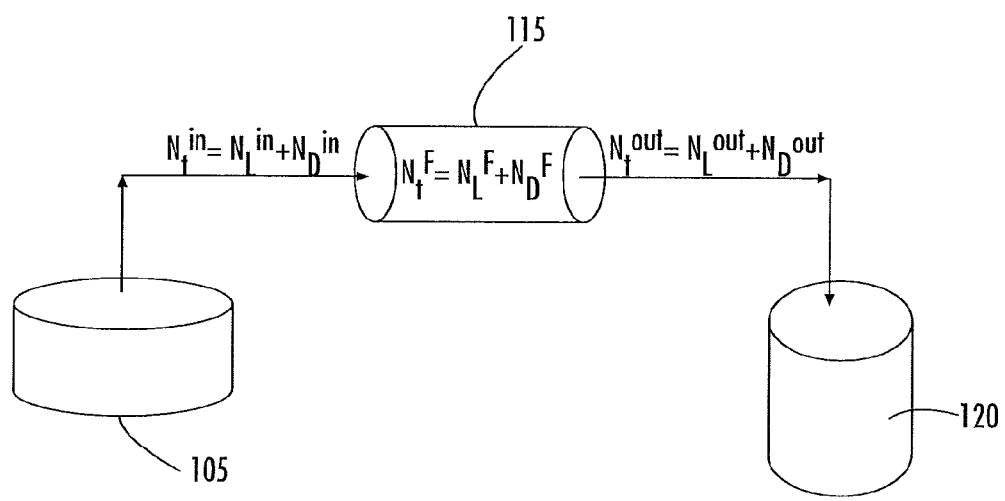
FIG. 2 provides an illustration of and formulae describing filter capture and kill phenomena.

Referring to FIG. 2, and the formulae illustrated:
$N_T^{in}$: total number of aerosolized cells entering the filter
$N_L^{in}$: number of viable/live cells entering the filter
$N_D^{in}$: number of dead cells entering the filter
$N_t^{out}$: total number of cells entering the Biosampler
$N_L^{out}$: number of viable/live cells entering the Biosampler
$N_D^{out}$: number of dead cells entering the Biosampler
$N_t^{F}$: total number of cells inside filter
$N_L^{F}$: number of viable/live cells inside filter
$N_D^{F}$: number of dead cells inside filter According to one study, $N_L^{in}$ is approximately equal to 0.3 $N_T^{in}$. Since $N_d^{in}$, $N_d^{out}$, $N_d^{F}$ cannot be measured, we define the efficiency factors in terms of the viable/live cells only. The mechanical capture efficiency is given by the formula:

$$\eta_{mech} = \frac{N_L^{in} - N_L^{out}}{N_L^{in}}$$

The chemical kill efficiency is given by the formula:

$$\eta_{chem} = \frac{(N_L^{in} - N_L^{out}) - N_L^F}{(N_L^{in} - N_L^{out})}$$

Results and Discussion:

The results of the study are presented in Tables 1A and 1B, respectively. The total number of bacteria passed through the control DPF (i.e., without antimicrobial (AM) agent) and passed through the AM-DPF (having an APS antimicrobial agent coating) are $9.46 \times 10^6$ and $8.17 \times 10^6$, respectively. The number of viable bacterial collected at the exit end of the DPF by the biosampler were $3 \times 10^4$ and $3.2 \times 10^3$, respectively. Therefore, the total number of viable bacteria trapped and/or killed by the disclosed filters are 99.68% and 99.96%, respectively.

However, the analysis of the viable bacteria count trapped inside the filters showed a clear distinction in the "kill" capacities of the two filters. The number of viable bacteria found inside the control-DPF was $3.07 \times 10^6$ while that found inside the AM-DPF was $2.5 \times 10^3$. This confirmed the significant advantage of the disclosed AM-DPF over the control-DPF (no antimicrobial agent). The number of viable bacteria inside the control-DPF was on about the same order of magnitude as the number of bacteria physically trapped. In contrast, the number of viable bacteria inside the AM-DPF was about three orders of magnitude lower than the number of bacteria physically trapped. This leads to % "kill" efficiencies of about 67% and 99.97%, respectively, for the control-DPF and AM-DPF. It is noteworthy that while a 67% kill capacity, on initial inspection, seems like a reasonably large number for the control-DPF article, measurement error(s) may contribute significantly to this value. In contrast, the three orders of magnitude reduction in the viable bacteria in the AM-DPF article is beyond measurement error. For example, according to an EPA approved test, a 99.9% reduction in the numbers of viable pathogens is required to support a sanitization claim (see on-line for example, epa.gov/oppad001/pdf_files/test_meth_residual_surfaces).

The above experiments were repeated in duplicate and similar results to the first results were obtained.

In addition, both the regular or un-modified DPF and the disclosed AM-DPF showed excellent flow-through properties in that air could flow through the DPF without any significant pressure drop for 70 minutes. While 70 minutes was not long, the bacteria concentration (in cfcu per 10 was four orders of magnitude higher than that in a regular or typical filter use in a confined or inhabited space (e.g., office buildings, hospitals, airplanes, etc.), and the amount of bacteria captured was equivalent to months of circulating regular indoor air through the filter. It is reasonable to assume that the filter may not have to be replaced or regenerated for many months, for example, a service life of about 3 to 12 months.

Based on the above measurements, the disclosed AM-DPF articles and the AMF articles, in combination with other filtration equipment, can provide an efficient and cost effective approach for removing or cleaning indoor air of pathogens.

The disclosure has been described with reference to various specific embodiments and techniques. However, it should be understood that many variations and modifications are possible while remaining within the scope of the disclosure.

TABLE 1A

| | Data | | | |
|---|---|---|---|---|
| Filter type | Total CFU Aerolized, $N_t^{in}$ | Viable CFU aerosolized, $N_L^{in}$ | Biosampler CFU, $N_L^{out}$ | Recovered Filter CFU, $N_L^F$ |
| DPF without AM | 1.00E+06 | 3.16E+05 | 2.28E+04 | 2.30E+05 |
| Cu | 1.00E+06 | 3.16E+05 | 3.64E+03 | 5.75E+01 |

TABLE 1A-continued

Data

| Filter type | Total CFU Aerolized, $N_t^{in}$ | Viable CFU aerosolized, $N_L^{in}$ | Biosampler CFU, $N_L^{out}$ | Recovered Filter CFU, $N_L^F$ |
|---|---|---|---|---|
| APS | 1.49E+07 | 4.73E+06 | 6.76E+04 | 6.60E+03 |
| DPF without AM | 4.46E+07 | 1.41E+07 | 3.40E+04 | 3.07E+06 |
| APS | 3.17E+07 | 1.00E+07 | 3.20E+03 | 2.50E+03 |
| Cu | 2.02E+07 | 6.40E+06 | 4.68E+04 | 3.09E+05 |

TABLE 1B

Calculations

| Filter type | Total viable CFU in Biosampler and in Filter, $N_L^{out} + N_L^F$ | mechanical efficiency, $\eta_{mech}$, % | chemical efficiency, $\eta_{chem}$, % |
|---|---|---|---|
| DPF without AM | 2.53E+05 | 92.78 | 21.56 |
| Cu | 3.70E+03 | 98.85 | 99.98 |
| APS | 7.42E+04 | 98.57 | 99.86 |
| DPF without AM | 3.10E+06 | 99.76 | 78.17 |
| APS | 5.70E+03 | 99.97 | 99.97 |
| Cu | 3.56E+05 | 99.27 | 95.14 |

What is claimed is:

1. An air filter article, comprising:
   a ceramic wall-flow honeycomb particulate filter; and
   at least one anti-microbial agent on at least a portion of the interior wall surfaces of the filter, wherein the anti-microbial agent is chosen from charged organic compounds.

2. The article of claim 1 wherein the anti-microbial agent is an aminopropylsilsesquioxane.

3. The article of claim 1 wherein the ceramic wall-flow honeycomb particulate filter has:
   any filter dimensions of the length, the width, or the height, of from 1 inch to 5 feet;
   % porosity of from 20 to 80 vol %;
   pore size of from 1 nm to 100 microns; and
   cell density of from 500 to 5000 cpsi.

4. A method of making the filter article of claim 1, comprising at least one of:
   dipping a portion of a wall-flow honeycomb particulate filter into a liquid containing at least one anti-microbial agent;
   including an anti-microbial agent in a batch mixture and extruding the mixture through a honeycomb forming die;
   exposing a honeycomb to vapor containing the anti-microbial agent;
   exposing a honeycomb to an aerosol containing the anti-microbial agent;
   or a combination thereof.

5. The method of claim 4 wherein the particulate filter has:
   any filter dimensions of the length, the width, or the height, of from 1 inch to 5 feet;
   % porosity of from 20 to 80 vol %;
   pore size of from 1 nm to 100 microns; and
   cell density of from 500 to 5000 cpsi.

6. The method of claim 4 wherein the dipping coats substantially the entire interior surface of the filter article with the anti-microbial agent by capillary action.

7. An air purification system, comprising:
   at least one air filter article of claim 1; and
   at least one air handler having a holder for the at least one air filter article, wherein the air handler directs ambient indoor source air through the at least one air filter article and expels filtered air having at least a 99.9% reduction in the numbers of viable pathogens compared to the ambient indoor source air.

8. The air purification system of claim 7 wherein at least a 99.9% reduction in the number of viable pathogens comprises at least a 90% pathogen capture rate and at least a 90% pathogen kill rate.

9. The article of claim 1 wherein the anti-microbial agent is a quaternary ammonium compound, an am inoalkylsilsesquioxane, a polyethyleneimine siloxane, or a combination thereof.

10. The article of claim 1 wherein one or more channels of the ceramic wall-flow honeycomb particulate filter are blocked such that during operation air flow penetrates at least one interior wall of the ceramic wall-flow honeycomb particulate filter.

11. An air purification system, comprising:
    at least one air filter article comprising a ceramic wall-flow honeycomb particulate filter and at least one anti-microbial agent on at least a portion of the interior wall surfaces of the filter; and
    at least one air handler, wherein the air handler directs ambient indoor source air through the at least one air filter article and expels filtered air having at least a 99.9% reduction in the numbers of viable pathogens compared to the ambient indoor source air.

12. The air purification system of claim 11 wherein the anti-microbial agent is at least one of: a noble metal, a transition metal, a charged organic compound, or a combination thereof.

13. The air purification system of claim 11 wherein the anti-microbial agent is a metal selected from at least one of: Au, Ag, Cu, Zn, a transition metal oxide, or a combination thereof.

14. The air purification system of claim 11 wherein the anti-microbial agent is a quaternary ammonium compound, an am inoalkylsilsesquioxane, a polyethyleneimine siloxane, or a combination thereof.

15. The air purification system of claim 11 wherein the anti-microbial agent is a Cu compound or an aminopropylsilsesquioxane.

* * * * *

UNITED STATES PATENT AND TRADEMARK OFFICE
CERTIFICATE OF CORRECTION

PATENT NO. : 10,328,372 B2  
APPLICATION NO. : 14/712112  
DATED : June 25, 2019  
INVENTOR(S) : Prantik Mazumder et al.

Page 1 of 1

It is certified that error appears in the above-identified patent and that said Letters Patent is hereby corrected as shown below:

In the Claims

Column 10, Lines 23-24, Claim 9, delete "am inoalkylsilsesquioxane," and insert -- aminoalkylsilsesquioxane, --, therefor.

Column 10, Line 51, Claim 14, delete "am inoalkylsilsesquioxane," and insert -- aminoalkylsilsesquioxane, --, therefor.

Signed and Sealed this  
Twenty-fourth Day of December, 2019

Andrei Iancu  
*Director of the United States Patent and Trademark Office*